(12) United States Patent
Knapp et al.

(10) Patent No.: US 9,706,553 B2
(45) Date of Patent: Jul. 11, 2017

(54) METHODS AND APPARATUSES FOR SHARED MULTIOPERATOR LTE SERVICE IN UNLICENSED FREQUENCY BANDS

(71) Applicant: QUALCOMM Incorporated, San Diego, CA (US)

(72) Inventors: Edward Knapp, Basking Ridge, NJ (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/248,086

(22) Filed: Apr. 8, 2014

(65) Prior Publication Data
US 2015/0289270 A1    Oct. 8, 2015

(51) Int. Cl.
*H04W 72/04* (2009.01)
*H04W 72/12* (2009.01)
(Continued)

(52) U.S. Cl.
CPC ..... *H04W 72/0453* (2013.01); *H04L 27/0006* (2013.01); *H04W 16/14* (2013.01);
(Continued)

(58) Field of Classification Search
CPC ..... H04W 88/10; H04W 16/14; H04W 48/18; H04W 76/022; H04W 8/02; H04W 8/12
See application file for complete search history.

(56) References Cited

U.S. PATENT DOCUMENTS

2012/0106464 A1* 5/2012 Ma .................. H04W 16/14
370/329
2013/0072186 A1   3/2013 Picker et al.
(Continued)

FOREIGN PATENT DOCUMENTS

EP         2 688 348 A1   1/2014
WO    WO-2012/174213 A1  12/2012

OTHER PUBLICATIONS

International Search Report and Written Opinion—PCT/US2015/023703—ISA/EPO—Jul. 22, 2015. (13 total pages).

*Primary Examiner* — Liton Miah
(74) *Attorney, Agent, or Firm* — Changwoo Yang

(57) ABSTRACT

Methods and apparatuses are described for providing a shared eNodeB that is configured to provide shared network access to UEs associated with disparate cellular service providers, or operators, over one or more unlicensed frequency bands in a multi-operator, heterogeneous, and dual-connectivity-compatible system. In an example methodology, a shared eNodeB may establish a secondary communication link with a first user equipment associated with a first operators primary cell, then may establish another secondary communication link with a second UE associated with a second operators primary cell, wherein the shared eNodeB is configured to communicate with both a first core network associated with the first operator and a second core network associated with the second operator, and may communicate wirelessly over one or more unlicensed frequency bands with both the first UE via the first communication link and the second UE via the second communication link.

31 Claims, 9 Drawing Sheets

(51) Int. Cl.
*H04W 16/14* (2009.01)
*H04W 88/10* (2009.01)
*H04L 27/00* (2006.01)
H04J 11/00 (2006.01)
H04L 5/00 (2006.01)
H04W 84/04 (2009.01)

(52) U.S. Cl.
CPC ....... *H04W 72/1263* (2013.01); *H04W 88/10* (2013.01); *H04J 2011/0003* (2013.01); *H04L 5/001* (2013.01); *H04W 84/045* (2013.01)

(56) References Cited

U.S. PATENT DOCUMENTS

| | | |
|---|---|---|
| 2013/0143502 A1 | 6/2013 | Kazmi et al. |
| 2013/0195054 A1 | 8/2013 | Horn et al. |
| 2013/0201890 A1 | 8/2013 | Swaminathan et al. |
| 2013/0337821 A1 | 12/2013 | Clegg |
| 2013/0344883 A1 | 12/2013 | Rinne et al. |
| 2014/0010171 A1 | 1/2014 | Morrill et al. |
| 2015/0057011 A1* | 2/2015 | Di Girolamo ........ H04W 16/14 455/454 |

* cited by examiner

METHODS AND APPARATUSES FOR SHARED MULTIOPERATOR LTE SERVICE IN UNLICENSED FREQUENCY BANDS

BACKGROUND

The following description relates generally to wireless communications, and more particularly to providing a shared eNodeB for wireless communication with a plurality of operator networks over one or more unlicensed frequency bands.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

For example, currently, there is a lack of universal or common spectrum for small cells in public locations (e.g., coffee shops, stadiums, etc.). Today this neutral host model is typically solved by WiFi and/or legacy Distributed Antenna System (DAS) models for Third Generation (3G) or Fourth Generation (4G) wireless networks. Small cell growth requires the use of common equipment for users of multiple service providers or even common or shared spectrum. Other alternatives previously utilized include multi-standard compatible systems where WiFi and multiple-access licensed frequency band systems associated with particular service providers are aggregated. These solutions, however, are expensive and require independent core infrastructure to support the baseband operations and separate radios for each licensed spectrum owner or service provider.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents methods and apparatuses for providing a shared eNodeB for wireless communication with a plurality of operator networks over one or more unlicensed frequency bands. For example, the present disclosure presents an example method of wireless communication, including establishing, at the shared eNodeB, a first communication link with a first user equipment (UE) associated with a first operator, establishing, at the shared eNodeB, a second communication link with a second UE associated with a second operator, wherein the shared eNodeB is configured to communicate with both a first network associated with the first operator and a second network associated with the second operator, and communicating wirelessly over one or more unlicensed frequency bands with both the first UE via the first communication link and the second UE via the second communication link.

In an additional aspect, the present disclosure presents an apparatus for mobile communication that includes a communication link establishing component configured to establish a first communication link with a first UE associated with a first operator and a second communication link with a second UE associated with a second operator, wherein the shared eNodeB is configured to communicate with both a first network associated with the first operator and a second network associated with the second operator. Such an example apparatus of the present disclosure may also include a shared communication component configured to communicate wirelessly over one or more unlicensed frequency bands with both the first UE via the first communication link and the second UE via the second communication link.

Furthermore, the present disclosure presents an apparatus for mobile communication that may include means for establishing, at a shared eNodeB, a first communication link with a first user equipment (UE) associated with a first operator and means for establishing, at the shared eNodeB, a second communication link with a second UE associated with a second operator, wherein the shared eNodeB is configured to enable common multi-flow communications with both a first network associated with the first operator and a second network associated with the second operator. Such an example apparatus according to the present disclosure may also include means for communicating wirelessly over one or more unlicensed frequency bands with both the first UE via the first communication link and the second UE via the second communication link.

In a further aspect, the present disclosure presents an example non-transitory computer-readable storage medium, comprising instructions, that when executed by a processor, cause the processor to establish, at a shared eNodeB, a first communication link with a first user equipment (UE) associated with a first operator, establish, at the shared eNodeB, a second communication link with a second UE associated with a second operator, wherein the shared eNodeB is configured to communicate with both a first network associated with the first operator and a second network associated with the second operator, and communicate wirelessly over one or more unlicensed frequency bands with both the first UE via the first communication link and the second UE via the second communication link.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
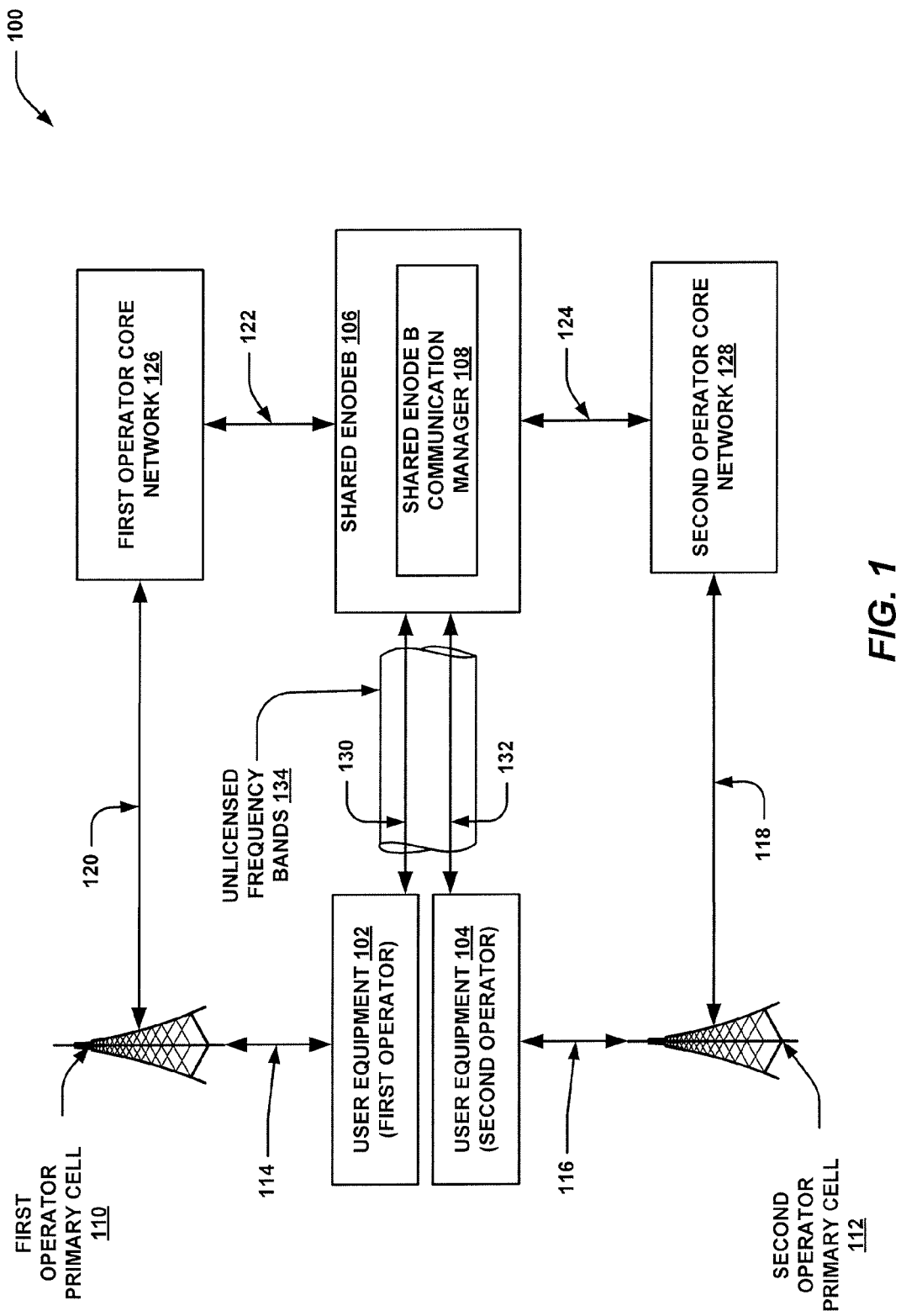
FIG. 1 is a block diagram illustrating an example wireless communications system according to the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure presents methods and apparatuses for a shared eNodeB that is configured to provide network access to UEs associated with disparate cellular service providers, or "operators," over one or more unlicensed frequency bands in a multi-operator heterogeneous network system. Such unlicensed frequency bands may include frequency bands that have not been allocated to a licensed operator and may comprise at least one contention-based radio frequency band or spectrum. Utilizing the unlicensed frequency bands or unlicensed spectrum (e.g., 5 GHz, 900 MHz, 3.5 GHz, 2.4 GHz, etc.) enables new models for opportunistic sharing of common access point infrastructure between devices having different cellular service providers.

This disclosure proposes a solution which improves upon both legacy standalone modes of operation in the unlicensed spectrum and previous attempts to design a multi-operator eNodeB (e.g. DAS). Instead of utilizing collocated and common controlled WiFi access points, the present disclosure proposes the use of a shared eNodeB resource configured for wireless communication in the unlicensed spectrum and further configured to communicate with devices of multiple licensed band operators to provide shared supplemental communication services (e.g. supplemental downlink (SDL) or uplink) to these devices over the unlicensed spectrum.

For example, in an aspect of the present disclosure, a first UE may be a device associated with a first operator and connected to a primary (or master) access point (e.g., macrocell or small cell) and configured with dual connectivity functionality such that the first UE may also communicate with the shared eNodeB of the present disclosure, which may be configured for communication in the unlicensed spectrum as a secondary access point. In an additional aspect, the shared eNodeB of the present disclosure may be configured to provide cached content or best-effort Quality of Service (QoS) sessions. In addition, a second UE associated with infrastructure of a second operator network and connected to a primary macrocell or small cell in the licensed band can also schedule data using the same shared eNodeB of the present disclosure. Thus, the shared eNodeB of the present disclosure can be contemporaneously utilized by multiple UEs associated with different operators as an opportunistic access point or secondary access point using the unlicensed spectrum (e.g. for dual connectivity and/or multi-flow-enabled systems). Additionally, the shared eNodeB utilizing the unlicensed spectrum may serve as a standalone eNodeB (open network ID) if a UE is not already associated with a licensed band operator or if coverage from the band operator is not available.

FIG. 1 is a schematic diagram illustrating a system 100 for wireless communication, according to an example configuration. FIG. 1 includes one or more UEs, including a UE 102 associated with a first operator and another UE 104 associated with a second operator. Either or both of UEs 102 and 104 may be configured to communicate with a plurality of access points contemporaneously. In other words, UEs 102 and 104 may be configured with dual-connectivity and/or multiflow capability such that each UE may receive primary wireless access from an access point associated with their respective operators and may also receive supplemental wireless access from a shared secondary access point (e.g., in a heterogeneous network), allowing for higher throughput rates than would be realized with access to a single access point. For example, UE 102 may communicate with first operator primary cell 110 for primary wireless access over a primary communication link 114, which may be referred to herein as a first primary communication link, and UE 104 may communicate with second operator primary cell 112 for secondary wireless access over a primary communication link 116, which may be referred to herein as a second primary communication link. In an example aspect, first operator primary cell 110 and second operator primary cell 112 may be macrocells and/or eNodeBs (or other access point types) associated with these individual macrocells operated according to the protocols of a first operator and second operator, respectively. As such, first operator primary cell 110 may be in communication with a first operator core network 126 over a backhaul link 120 and second operator primary cell 112 may be in communication with a second operator core network 128 over a backhaul link 118.

In addition, either or both of UE 102 and UE 104 may comprise any type of mobile device, such as, but not limited to, a smartphone, cellular telephone, mobile phone, laptop computer, tablet computer, or other portable networked device. In addition, UE 102 and/or UE 104 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In general, UE 102 and/or UE 104 may be small and light enough to be considered portable and may be configured to communicate wirelessly via an over-the-air (OTA) communication link using one or more OTA communication protocols described herein.

System 100 further includes a shared eNodeB 106 that operates in accordance with aspects of the present disclosure. Shared eNodeB 106 may be configured to serve as a secondary access point for aggregated wireless access for downlink and/or uplink communication for a plurality of UEs with which shared eNodeB 106 is communicatively connected. Furthermore, shared eNodeB 106 may be configured to communicate with each of the plurality of UEs over one or more unlicensed frequency bands 134 and may do so in an operator-agnostic fashion. In other words, the shared eNodeB 106 may communicate over one or more unlicensed frequency bands 134 with UE 102 and UE 104 via over-the-air communication links 130 and 132, respectively, regardless of the operator associated with each UE. In a further aspect, the one or more unlicensed frequency bands 134 may include industrial, scientific, and medical (ISM) bands, such as, but not limited to, 900 MHz, 3.5 GHz, 2.4 GHz, and 5 GHz. In addition, the one or more unlicensed frequency bands 134 may include frequency ranges or values that are not precisely equal to 900 MHz, 3.5 GHz, 2.4 GHz, and 5 GHz, but are within a range of (e.g., greater or less than) approximately 100-500 MHz of these frequency values, or "about" 900 MHz, 3.5 GHz, 2.4 GHz, or 5 GHz. In other words, for purposes of the present disclosure, the term "about" followed by a specific frequency value may indicate that the one or more unlicensed frequency bands associated with the specific frequency value may include the specific frequency value itself and may further include a range of frequency values greater than or less than the specific frequency value. In some examples, this range of frequency values may comprise a range of 100-500 MHz greater than and/or less than the specific frequency value, or any other frequency range that may be associated with the stated specific frequency value by one of skill in the art.

Likewise, shared eNodeB 106 may be configured to communicate with a plurality of operator networks, which, in some examples, may operate according to a plurality of radio access technologies (RATs). For example, shared eNodeB 106 may be configured to communicate with first operator core network 126 according to a first radio access technology over a backhaul link 122. Likewise, shared eNodeB 106 may be configured to communicate with second operator core network 128 according to a second radio access technology over a backhaul link 124. In addition, shared eNodeB 106 may include a shared eNodeB communication manager 108, which may be configured to manage communication with a plurality of UEs (e.g. UE 102 and UE 104) over one or more unlicensed frequency bands 134 and with a plurality of operator networks associated with the plurality of UEs. Shared eNodeB communication manager 108 is further described in reference to FIG. 2, below.

Furthermore, though first operator primary cell 110 and second operator primary cell 112 may comprise macro cells providing cellular communication services to UE 102 and 104, respectively, each of first operator primary cell 110 and second operator primary cell 112 may represent eNodeBs or any other network entity configured to provide and manage macro cells. In some examples, however, first operator primary cell 110 and second operator primary cell 112 may comprise an access point other than a macro cell of a cellular network. Thus, first operator primary cell 110, second operator primary cell 112, first operator core network 126, and/or second operator core network 128 of FIG. 1 may comprise one or more of any type of network module, such as an access point, a macro cell, including a base station (BS), node B, eNodeB (eNB), a relay, a peer-to-peer device, an authentication, authorization and accounting (AAA) server, a mobile switching center (MSC), a mobility management entity (MME), a radio network controller (RNC), or a small cell. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a BS, an access point, a femto node, a femtocell, a pico node, a micro node, a Node B, eNB, home Node B (HNB) or home evolved Node B (HeNB). Therefore, the term "small cell," as used herein, refers to a relatively low transmit power and/or a relatively small coverage area cell as compared to a macro cell. In a further aspect of the present disclosure, shared eNodeB 106 may comprise a small cell.

Additionally, first operator core network 126 and second operator core network 128 may be associated with the first operator of UE 102 and second operator of UE 104, respectively. First operator core network 126 and second operator core network 128 may be of any network type, such as, but not limited to, wide-area networks (WAN), wireless networks (e.g. 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet. Such networks may comprise a Wideband Code Division Multiple Access (W-CDMA) system, and may communicate with one or more UEs 102 according to this standard. As those skilled in the art will readily appreciate, various aspects described throughout this disclosure may be extended to other telecommunication systems, network architectures, radio access technologies, and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, radio access technology, and/or communication standard employed will depend on the specific application and the overall design constraints imposed on the system.

Figure 2:
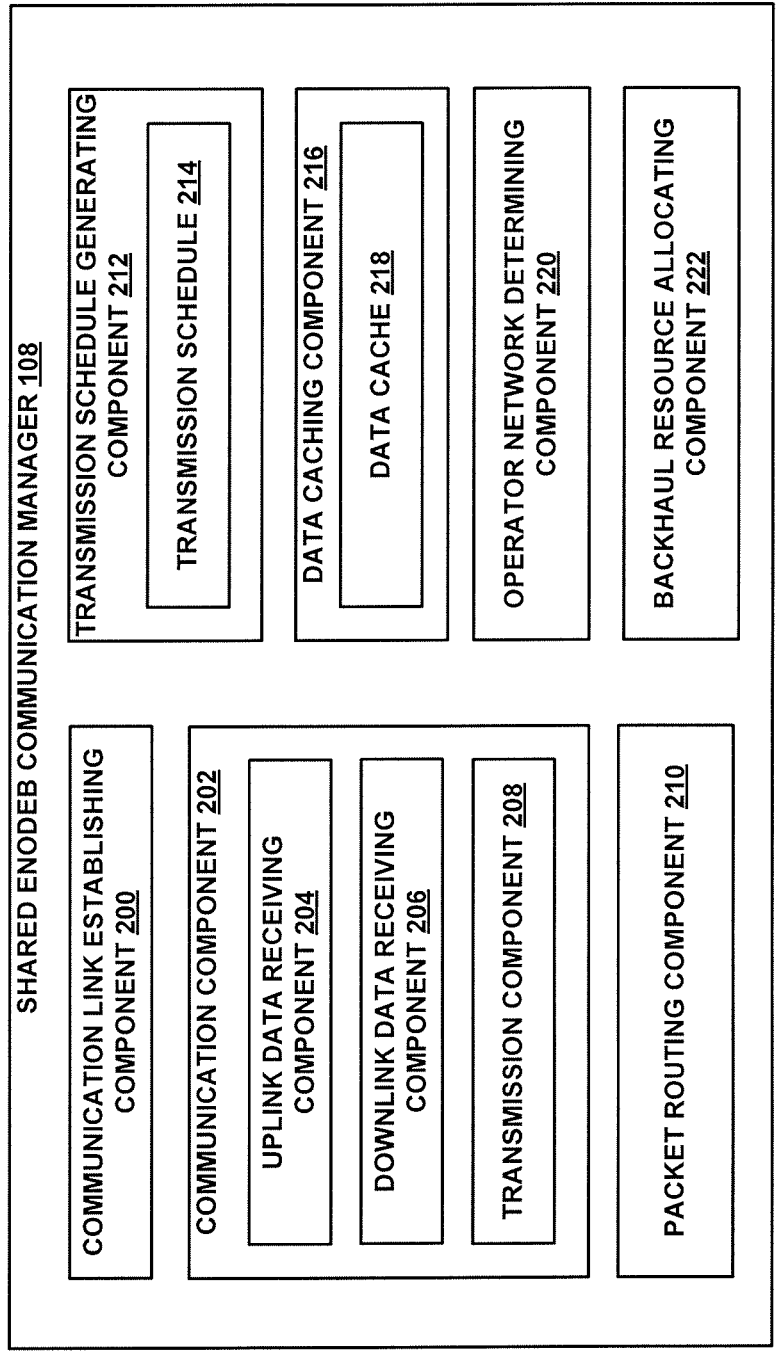
FIG. 2 is a block diagram illustrating an example shared eNodeB communication manager according to an example apparatus of the present disclosure.

Turning to FIG. 2, further aspects of an example shared eNodeB communication manager 108 (of FIG. 1, for example) are presented as comprising a plurality of individual components for carrying out the one or more methods or processes described herein. In an aspect, shared eNodeB communication manager 108 may include a communication link establishing component 200, which may be configured to establish communication links with one or more UEs in a wireless communication system. For example, the communication link establishing component 200 may be configured to establish a first communication link with a first UE associated with a first operator and to establish a second communication link with a second UE associated with a second operator, wherein the shared eNodeB is configured to communicate with both a first network associated with the first operator and a second network associated with the second operator. Furthermore, though first and second UEs associated with first and second operators are specifically discussed herein, the shared eNodeB and communication link establishing component 200 may be configured to establish any number of communication links with any number of UEs associated with any number of operators utilizing any radio access technology or protocol.

In an aspect, establishing such a communication link with a UE associated with a particular operator may include receiving a communication link establishment request from one or more UEs and transmitting connection parameters for establishing communication with the shared eNodeB. In some examples, the communication link establishing component 200 may transmit these connection parameters via a pilot, beacon, or other broadcast signal that contains the connection parameters. In addition, because the shared eNodeB of the present disclosure may be configured to communicate via a plurality of radio access technology protocols specific to particular network operators, the communication link establishing component 200 may be further configured to establish the communication link using protocols and/or parameters that are specific to the individual operators of the one or more UEs. Moreover, this communication link establishment may occur over one or more unlicensed frequency bands.

Furthermore, shared eNodeB communication manager 108 may include a communication component 202, which may be configured to manage shared eNodeB communication with a plurality of UEs over one or more unlicensed frequency bands and with one or more operator networks associated with the plurality of UEs. In an aspect, such communication may include uplink and/or downlink data communication, control signaling, backhaul request or grant messages, hybrid automatic repeat request (HARQ) signaling, or any other form of communication associated with wireless communication systems. Furthermore, communication component 202 may be configured with Self-organizing Network (SON) functionality as to allow shared eNodeB 106 to optimize operational parameters and seamlessly integrate with existing network architecture.

For example, communication component 202 may include an uplink data receiving component 204, which may be configured to receive uplink data associated with one or more uplink data flows corresponding to one or more UEs served by the shared eNodeB of the present disclosure. This uplink data may include uplink data packets and control information associated with the uplink data, which may identify the contents of the uplink data packets and destination information identifying an operator network to which the uplink data packets are to be routed, a flow to which each of the uplink data packets belong, and/or the UE at which the uplink data originated. In an aspect, such uplink data may be received over one or more unlicensed frequency bands. In addition, communication component 202 may be configured to establish and/or maintain one or more Internet Protocol (IP) tunnels for communicating data packets with multiple operator networks and/or gateways. Moreover, communication component 202 may be configured to manage communication security associated with each IP tunnel. For example, communication component 202 may be configured to authenticate and encrypt data packets associated with the IP tunnels according to Internet Protocol Security (IPsec). In addition, communication component 202 may include an encryption engine configured to encrypt data packets (e.g., according to Data Encryption Standard (DES) or any other encryption method or standard) as these data packets are routed to their respective operator networks. Furthermore, uplink data receiving component 204 may include a receiver, transceiver, or associated hardware and may manage one or more receive chains.

Additionally, communication component 202 may include a downlink data receiving component 206, which may be configured to receive data from network entities of one or more operator networks that is to be transmitted to one or more UEs in the downlink. In an aspect, the downlink data may include data packets and control information associated with the data packets, which may identify the contents of the data packets and destination information identifying a UE to which the data packets is to be routed, a flow to which the downlink data belongs, and/or the operator network at which the downlink data originated. Furthermore, downlink data receiving component 206 may include a receiver, transceiver, or associated hardware and may manage one or more receive chains.

In addition, communication component 202 may include a transmission component 208, which may be configured to transmit data and control signals originating from one or more operator networks to one or more UEs over one or more unlicensed frequency bands. Likewise, transmission component 208 may be configured to route and/or transmit data packets and control signals originating from one or more UEs to one or more operator networks associated with the one or more UEs. In an additional or alternative aspect, transmission component 208 may be configured to transmit common downlink data packets over one or more unlicensed frequency bands to a plurality of UEs via a broadcast channel. In some examples, the common downlink data packets may be transmitted according to Multimedia Broadcast Multicast Service (MBMS) standards, including, but not limited to, LTE Evolved MBMS (eMBMS) standards. Furthermore, transmission component 208 may include a transmitter, transceiver, or associated hardware and may manage one or more transmit chains.

Furthermore, shared eNodeB communication manager 108 may include a packet routing component 210, which may be configured to determine a destination of data packets to be transmitted by transmission component 208. Because the shared eNodeB of the present disclosure is configured to provide network access to a plurality of UEs associated with one or more operators, the data packets transmitted by the transmission component 208 must be routed to the correct UE (in the downlink) or operator network (in the uplink). To this end, for uplink data packets transmitted to the shared eNodeB over one or more unlicensed frequency bands, packet routing component 210 may be configured to obtain operator network identification information associated with each data packet and route the data packet to the operator network identified by the operator network identification information. In an aspect, packet routing component 210 may be configured to obtain and store one or more IP addresses associated with each of the multiple operator networks to allow for data packet routing to the correct operator network for each data packet.

Likewise, for downlink data packets transmitted to the shared eNodeB by the various operator networks, packet routing component 210 may be configured to obtain UE identification information associated with each of the downlink data packets and route the downlink data packet to the identified UE. In an aspect, such routing may include identifying a downlink data channel in one or more unlicensed frequency bands corresponding to the communication link between the shared eNodeB and the UE and passing this routing information to lower layers (e.g. a physical layer) for subsequent transmission by the transmission component 208.

In an additional aspect, shared eNodeB communication manager 108 may include a transmission schedule generating component 212, which may be configured to generate a transmission schedule 214 according to which transmission component 208 may transmit data or control signals. The transmission schedule generating component 212 may be configured to determine a signal transmission order of multiple signals that will be transmitted to UEs by transmission component 208 in the downlink over one or more unlicensed frequency bands. Additionally, the transmission schedule generating component 212 may be configured to determine a signal routing order of multiple signals previously received in the uplink from one or more UEs that will be routed to several disparate operator networks by transmission component 208. Moreover, transmission schedule generating component 212 may be configured to communicate with one or more network components associated with one or more operator networks in order to provide information regarding the status of packet processing and/or transmission. For example, transmission schedule generating component 212 may be configured to provide packet processing and/or transmission feedback to one or more eNodeBs (or shared eNodeBs 106) over an X2 interface in an LTE operator network.

Furthermore, shared eNodeB communication manager 108 may include a data caching component 216, which may be configured to cache data in a data cache 218 while the data awaits transmission by transmission component 208 according to transmission schedule 214. In an aspect, data cache 218 may comprise a memory associated with communication component 202.

In addition, shared eNodeB communication manager 108 may include an operator network determining component 220, which may be configured to determine an operator network associated with one or more UEs with which the shared eNodeB is currently communicating or with which the shared eNodeB has communicated in the past. For example, in an aspect, when a communication link between the shared eNodeB and a UE is established by communication link establishing component 200, operator network determining component 220 may request and/or obtain UE-specific operator identification information from the UE and save this operator identification information in a memory. Thereafter, operator network determining component 220 may determine the operator network to which any data packets received in the uplink from this UE is to be routed by reading this saved operator identification information from the memory. Operator network determining component 220 may also be configured to determine an operator network associated with any data packets that are received by communication component 202 from a UE in the uplink by extracting operator identification information from the packet itself. In an aspect, such operator identification information may be included in a header of data packets received from UEs in the uplink.

In an additional aspect, shared eNodeB communication manager 108 may include a backhaul resource allocating module 222, which may be configured to allocate one or more backhaul resources for data packet traffic in a plurality of operator networks. In an aspect, the backhaul resource allocating module 222 may be configured to transmit one or more backhaul resource allocation requests to a network entity controlling backhaul resource allocation for each of a plurality of operator networks. Furthermore, such a backhaul resource allocation request may be based on one or more data packets received from one or more UEs in the uplink which are to be routed to multiple operator networks via separate IP tunnels.

Through the aforementioned exemplary components are presented in reference to shared eNodeB communication manager 108, they are not exclusive. Instead, shared eNodeB communication manager 108 may include additional or alternative components configured to perform aspects of the present disclosure and the claims recited below.

Figure 3:
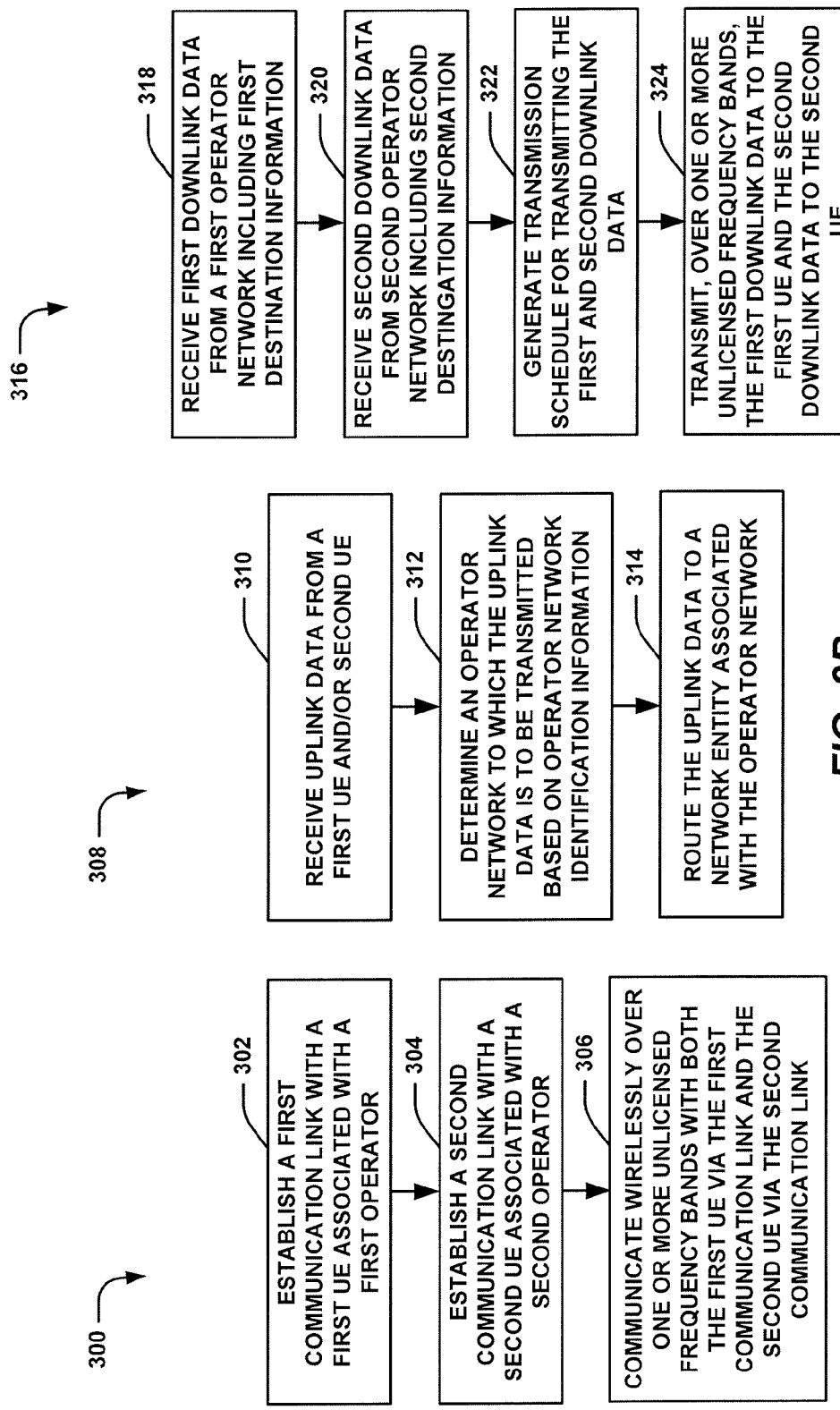
FIG. 3A is a flow diagram comprising a plurality of functional blocks representing an example methodology of the present disclosure.
FIG. 3B is a flow diagram comprising a plurality of functional blocks representing an additional example methodology of the present disclosure.
FIG. 3C is a flow diagram comprising a plurality of functional blocks representing yet another example methodology of the present disclosure.

FIGS. 3A, 3B, and 3C present exemplary methodologies 300, 308, and 316, respectively, which each include a non-limiting set of steps represented as blocks that may be performed by an apparatus described herein (e.g. shared eNodeB 106 of FIG. 1, shared eNodeB communication manager 108 of FIGS. 1 and 2). Referring to FIG. 3A, methodology 300 may comprise a method of mobile communication for providing a shared communication resource or access point for a plurality of UEs associated with a plurality of operators over one or more unlicensed frequency bands. In an aspect, methodology 300 may include, at block 302, establishing a first communication link with a first UE associated with a first operator having an associated first operator network. Additionally, at block 304, methodology 300 may include establishing a second communication link with a second UE associated with a second operator, wherein the shared eNodeB is configured to communicate with both a first network associated with the first operator and a second network associated with the second operator having an associated second operator network. Furthermore, at block 306, methodology 300 may include communicating wirelessly with the first UE via the first communication link and the second UE via the second communication link over one or more unlicensed frequency bands. In an aspect, such unlicensed frequency bands may be of a frequency of about 5 GHz, 3.5 GHz, or 2.4 GHz. Furthermore, such communication over the one or more unlicensed frequency bands may include transmitting data packets and/or control information to the first and second UEs (e.g., in one or more downlink channels) and receiving data packets and/or control information from the first and second UEs (e.g., in one or more uplink channels). In an additional aspect, at least one of the first communication link and the second communication link may be a secondary connection in a dual-connectivity wireless communication system. In other words, either or both of the first and second UEs may be configured to receive primary wireless communication access from a primary (or master) cell associated with the operator of each respective UE and may be further configured to receive secondary and/or supplementary wireless access (e.g., for uplink and/or downlink communication) from a shared eNodeB as described in the present disclosure.

Turning to FIG. 3B, a methodology 308 is presented, which may be performed in concert with methodology 300 or independently. In an aspect, methodology 308 may include, at block 310, receiving uplink data from a first UE and/or a second UE over one or more unlicensed frequency bands. In some examples, the uplink data may include associated operator network identification information indicating an operator network to which the uplink data is to be routed. The methodology 308 may further include, at block 312, determining an operator network to which the uplink data is to be routed (e.g., over a backhaul link) based on the operator network identification information. In addition, at block 314, methodology 308 may include transmitting the uplink data to the network entity (e.g., network gateway) associated with the operator network.

Furthermore, FIG. 3C presents an additional methodology 316 that may be performed in concert with either or both of methodologies 302 and 310 or may be performed independently. In an aspect, methodology 316 may include, at block 318, receiving first downlink data from a first operator network associated with the first operator and including first destination information (e.g., IP information) indicating that the first UE is to receive the first downlink data. Additionally, methodology 316 may include, at block 320, receiving second downlink data routed from a second operator network associated with the second operator and including second destination information (e.g., IP information) indicating the second UE is to receive the second downlink data. In some examples, the first downlink data and/or second downlink data may be cached in memory for subsequent transmission. Moreover, the first downlink data may be encoded according to a first encoding standard associated with the first operator and the second downlink data may be encoded according to a second encoding standard associated with the second operator.

Furthermore, at block 322, methodology 316 may include generating a transmission schedule for transmitting the first downlink data and the second downlink data. For example, in an aspect, the first downlink data and second downlink data may share a transmission queue and may be transmitted by a shared eNodeB of the present disclosure according to the transmission schedule, which may be maintained according to one or more rules that determine a relative transmission priority corresponding to packets in the transmission queue. In some examples, the transmission rules may be configured to select a transmission schedule based on network load and/or UE demand associated with each operator network to which the data packets are to be routed. For example, consider a first operator network having a first network load that is greater than a second network load associated with a second operator network. In this instance, packets in the transmission queue that are to be routed to the second operator network may be transmitted before packets that are to be routed to the first operator network. In an additional or alternative aspect, the transmission schedule may be based on one or more round robin scheduling algorithms.

In addition, at block 324, methodology 316 may include transmitting the first downlink data to the first UE and the second downlink data to the second UE over the one or more unlicensed frequency bands based on the transmission schedule generated at block 322. In an additional or alternative aspect, methodology 316 may include transmitting common downlink data packets over one or more unlicensed frequency bands to a plurality of UEs. In some examples, the common downlink data packets may be transmitted according to MBMS standards, including, but not limited to, eMBMS standards.

Figure 4:
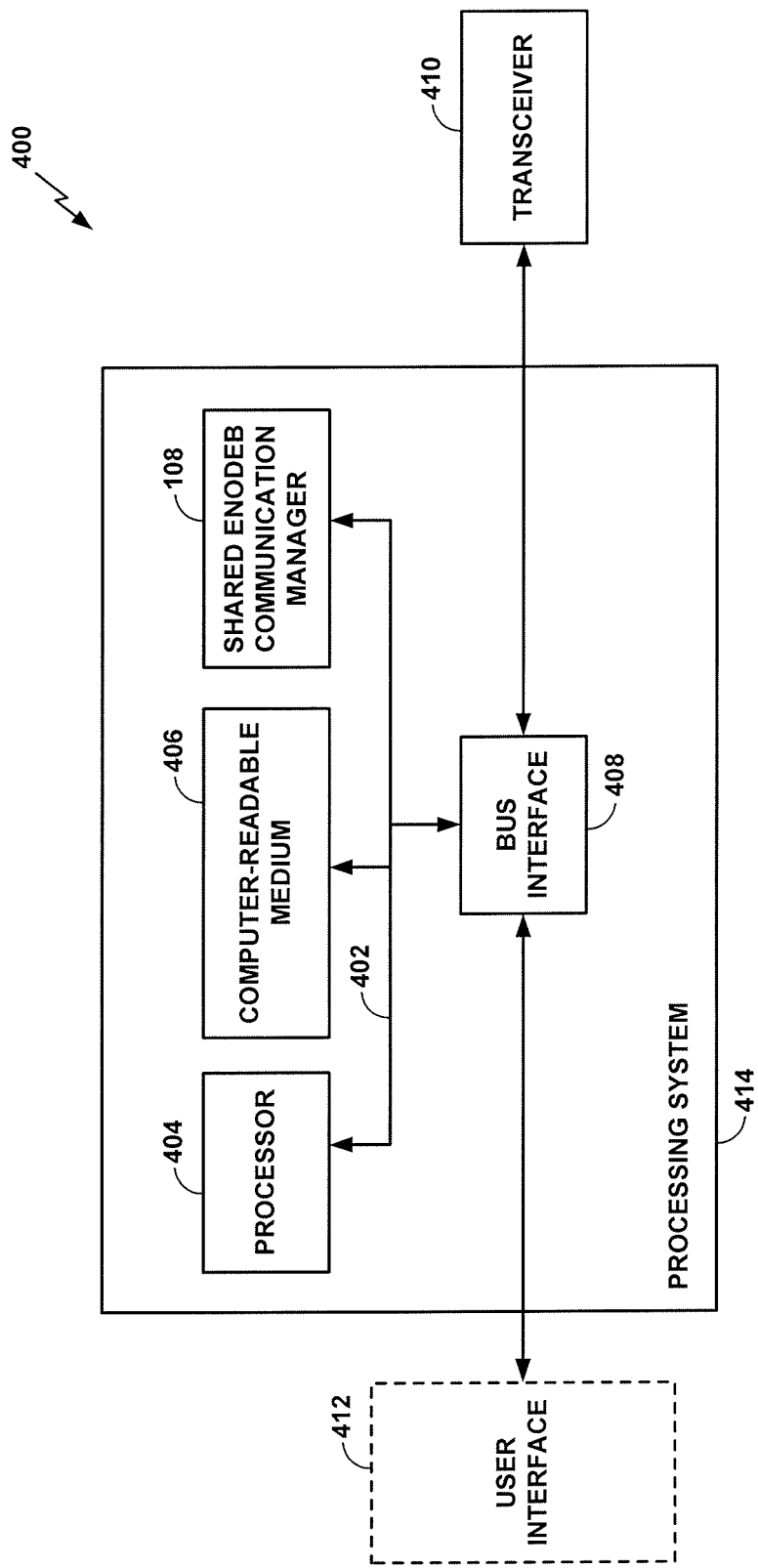
FIG. 4 is a diagram illustrating an example of a hardware implementation for an apparatus employing a processing system.

FIG. 4 is a conceptual diagram illustrating an example of a hardware implementation for an apparatus 400 employing a processing system 414. In some examples, the processing system 414 may comprise a shared eNodeB (e.g., shared eNodeB 106 of FIG. 1) or other access point (e.g. Wifi access point, macrocell, or small cell). In this example, the processing system 414 may be implemented with a bus architecture, represented generally by the bus 402. The bus 402 may include any number of interconnecting buses and bridges depending on the specific application of the processing system 414 and the overall design constraints. The bus 402 links together various circuits including one or more processors, represented generally by the processor 404, computer-readable media, represented generally by the computer-readable medium 406, and an shared eNodeB communication manager 108 (see FIGS. 1 and 2), which may be configured to carry out one or more methods or procedures described herein.

The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a means for communicating with various other apparatus over a transmission medium. Depending upon the nature of the apparatus, a user interface 412 (e.g., keypad, display, speaker, microphone, joystick) may also be provided.

The processor 404 is responsible for managing the bus 402 and general processing, including the execution of software stored on the computer-readable medium 406. The software, when executed by the processor 404, causes the processing system 414 to perform the various functions described infra for any particular apparatus. The computer-readable medium 406 may also be used for storing data that is manipulated by the processor 404 when executing software.

Figure 5:
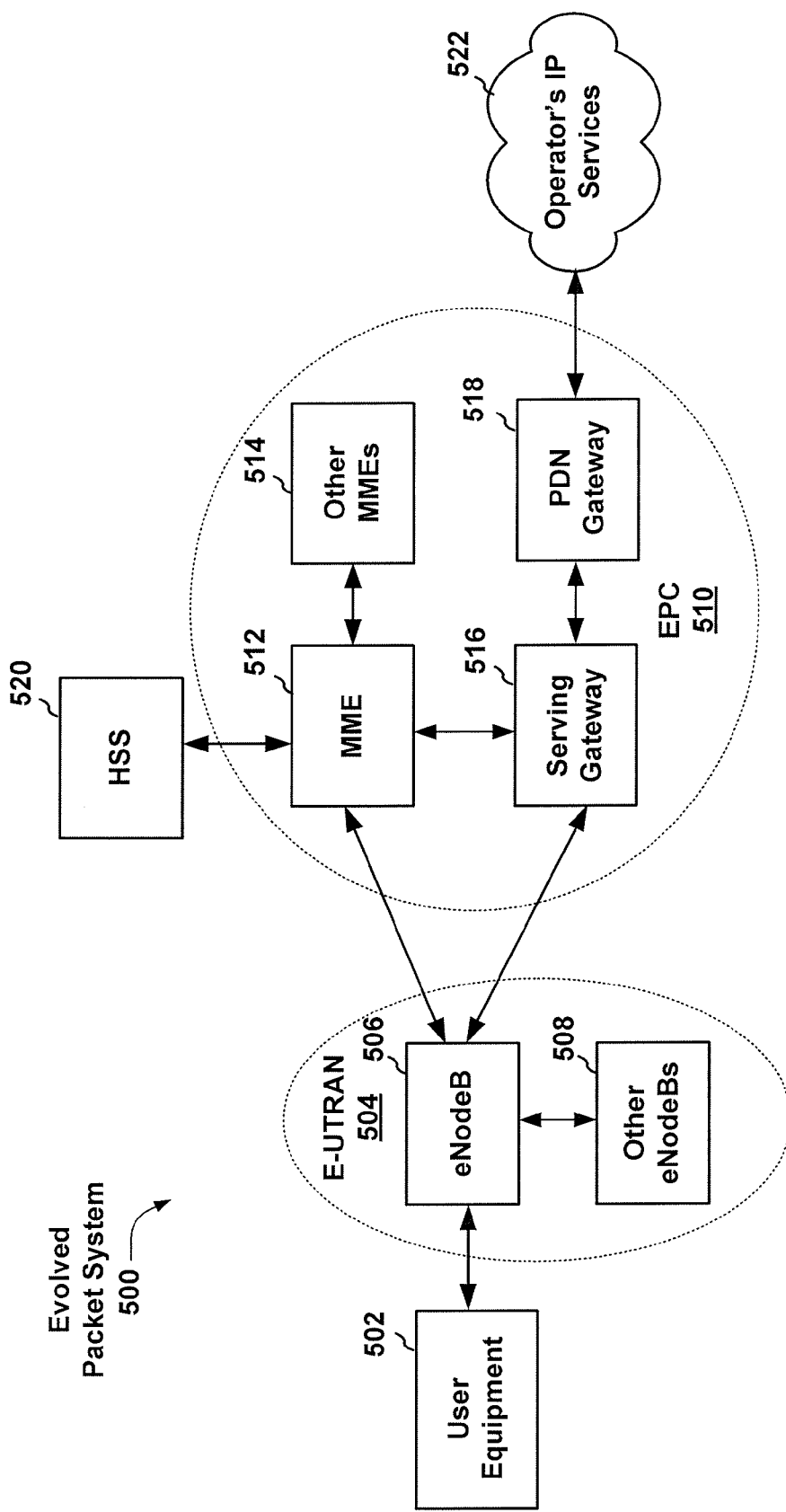
FIG. 5 is a block diagram conceptually illustrating an example of an LTE telecommunications system.

FIG. 5 is a diagram illustrating an LTE network architecture 500 employing various apparatuses (e.g., UEs 102 and 104, first operator primary cell 110, second operator primary cell 112, shared eNodeB 106, first operator core network 126, second operator core network 128, or any other UE or network entity associated with any aspect of FIG. 1). The LTE network architecture 500 may be referred to as an Evolved Packet System (EPS) 500. The EPS 500 may include one or more user equipment (UE) 502 (which may represent UE 102 and/or UE 104 of FIG. 1), an Evolved UMTS Terrestrial Radio Access Network (E-UTRAN) 504, an Evolved Packet Core (EPC) 510, a Home Subscriber Server (HSS) 520, and an Operator's IP Services 522. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing voice services and/or circuit-switched services.

The E-UTRAN includes the evolved Node B (eNB) 506 and other eNBs 508, one or more of which may represent shared eNodeB 106, first operator primary cell 110, and/or second operator primary cell 112 of FIG. 1. The eNB 506 provides user and control plane protocol terminations toward the UE 502. The eNB 506 may be connected to the other eNBs 508 via an X2 interface (i.e., backhaul links 118, 120, 122, and/or 124 of FIG. 1). The eNB 506 may also be referred to by those skilled in the art as a base station, a base transceiver station, a radio base station, a radio transceiver, a transceiver function, a basic service set (BSS), an extended service set (ESS), or some other suitable terminology. The eNB 506 provides an access point to the EPC 510 for a UE 502. Examples of UEs 502 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 502 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 506 is connected by an S1 interface to the EPC 510. The EPC 510 includes a Mobility Management Entity (MME) 512, other MMEs 514, a Serving Gateway 516, and a Packet Data Network (PDN) Gateway 518. The MME 512 is the control node that processes the signaling between the UE 502 and the EPC 510. Generally, the MME 512 provides bearer and connection management. All user IP packets are transferred through the Serving Gateway 516, which itself is connected to the PDN Gateway 518. The PDN Gateway 518 provides UE IP address allocation as well as other functions. The PDN Gateway 518 is connected to the Operator's IP Services 522. The Operator's IP Services 522 include the Internet, the Intranet, an IP Multimedia Subsystem (IMS), and a PS Streaming Service (PSS).

Figure 6:
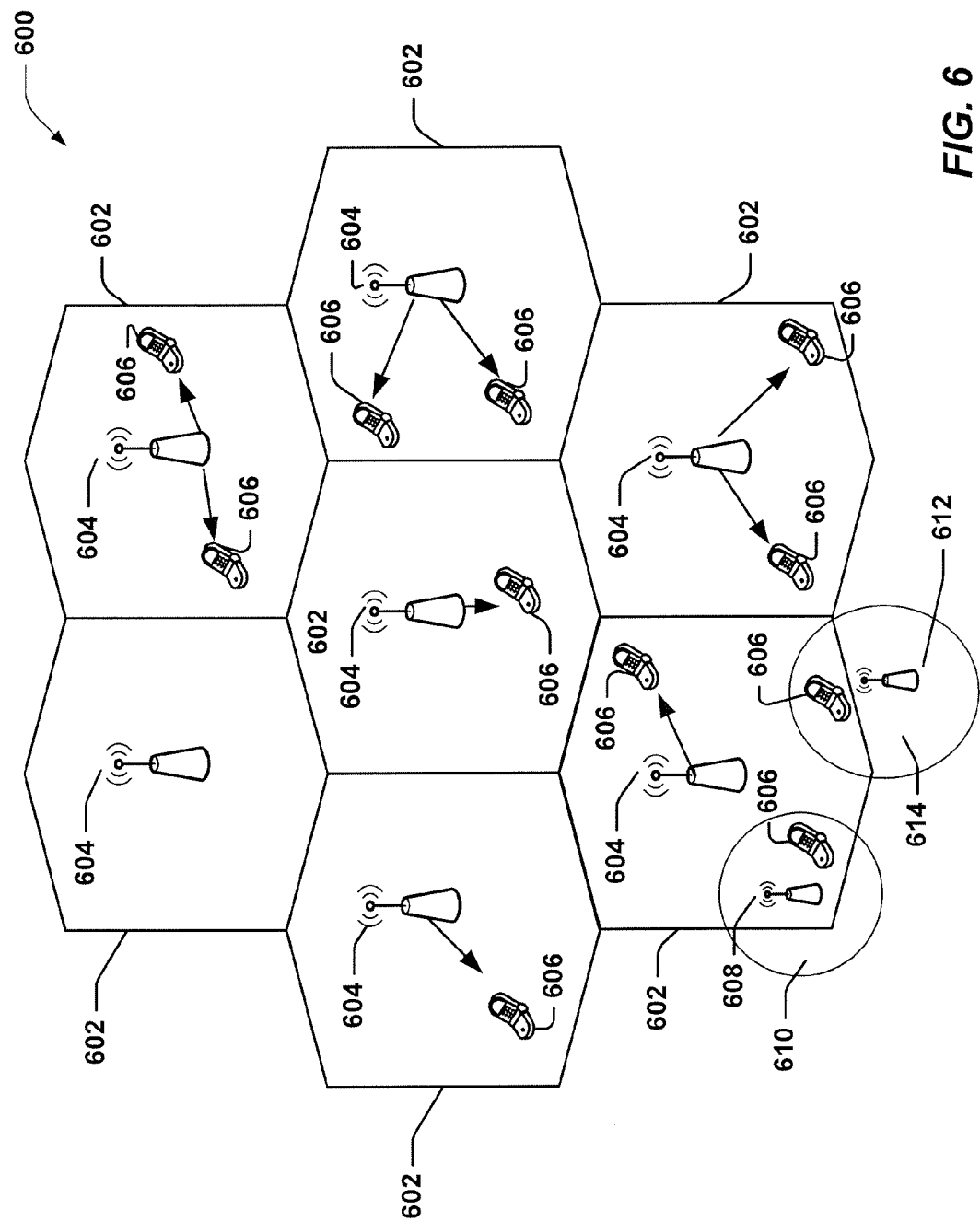
FIG. 6 is a diagram illustrating an example of an access network in an LTE network architecture.

FIG. 6 is a diagram illustrating an example of an access network in an LTE network architecture such as, for example, the LTE network architecture 500 of FIG. 5. In this example, the access network 600 is divided into a number of cellular regions (cells) 602, which, along with other cellular regions of FIG. 6, may represent the first operator primary cell 110, second operator primary cell 112, and/or a wireless access coverage region associated with shared eNodeB 106. One or more lower power class eNBs 608, 612 may have cellular regions 610, 614, respectively, that overlap with one or more of the cells 602. The lower power class eNBs 608, 612 may be small cells (e.g., home eNBs (HeNBs)) and/or may comprise wireless access coverage regions associated with shared eNodeB 106. In an alternative arrangement, the one or more lower power class eNBs 608, 612 may comprise lower power class eNBs other than shared eNodeB 106 and may each provide operator network specific primary access to UEs 606 that may be supplemented by shared eNodeB 106. A higher power class or macro eNB 604 is assigned to a cell 602 and is configured to provide an access point to the EPC 610 for all the UEs 606 in the cell 602. There is no centralized controller in this example of an access network 600, but a centralized controller may be used in alternative configurations. The eNB 604 is responsible for all radio related functions including radio bearer control, admission control, mobility control, scheduling, security, and connectivity to the serving gateway 616. In an aspect, one or more of the eNBs 604, 608, 612 may represent may represent the first operator primary cell 110, second operator primary cell 112, and/or shared eNodeB 106 of FIG. 1.

The modulation and multiple access scheme employed by the access network 600 may vary depending on the particular telecommunications standard being deployed. In LTE applications, orthogonal frequency-division multiplexing (OFDM) is used on the downlink (DL) and single-carrier frequency division multiple access (SC-FDMA) is used on the uplink (UL) to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 604 may have multiple antennas supporting multiple-input, multiple output (MIMO) technology. The use of MIMO technology enables the eNB 604 to exploit the spatial domain to support spatial multiplexing, beamforming, and transmit diversity. Such MIMO technology may also be utilized by shared eNodeB 106 of FIG. 1 and/or any UEs communicatively coupled thereto (e.g., UE 102 and/or UE 104 of FIG. 1).

Spatial multiplexing may be used to transmit different streams of data simultaneously on the same frequency. The data steams may be transmitted to a single UE 606 to increase the data rate or to multiple UEs 606 to increase the overall system capacity. This is achieved by spatially precoding each data stream and then transmitting each spatially precoded stream through a different transmit antenna on the downlink. The spatially precoded data streams arrive at the UE(s) 606 with different spatial signatures, which enables each of the UE(s) 606 to recover the one or more data streams destined for that UE 606. On the uplink, each UE 606 transmits a spatially precoded data stream, which enables the eNB 604 to identify the source of each spatially precoded data stream. In an aspect of the present disclosure, UE 606 may represent UE 102 and/or UE 104 of FIG. 1.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 7:
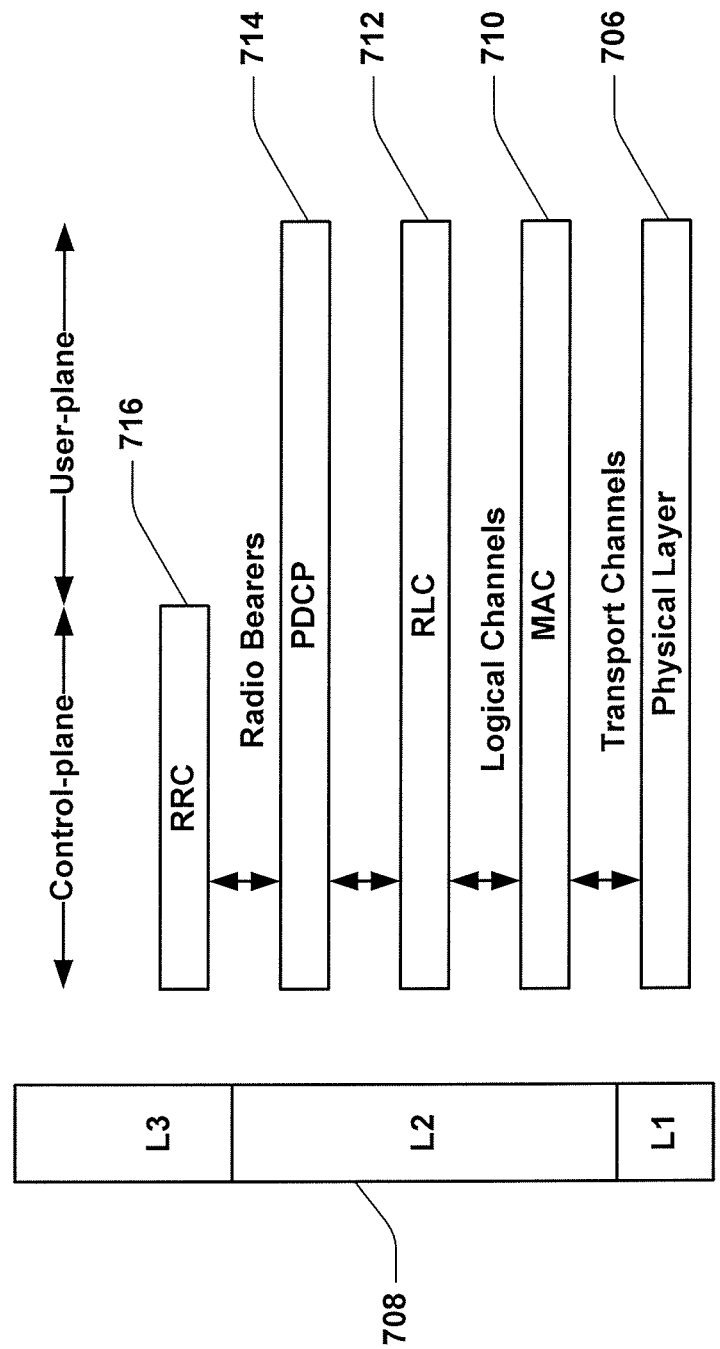
FIG. 7 is a diagram illustrating an example of a radio protocol architecture for the user and control plane.

Turning to FIG. 7, the radio protocol architecture for a UE (e.g., UEs 102 and/or 104 of FIG. 1) and an eNB (e.g., shared eNodeB 106, first operator primary cell 110, and/or second operator primary cell 112 of FIG. 1) is shown with three layers: Layer 1, Layer 2, and Layer 3. Layer 1 is the lowest layer and implements various physical layer signal processing functions. Layer 1 will be referred to herein as the physical layer 706. Layer 2 (L2 layer) 708 is above the physical layer 706 and is responsible for the link between the UE and eNB over the physical layer 706.

In the user plane, the L2 layer 708 includes a media access control (MAC) sublayer 710, a radio link control (RLC) sublayer 712, and a packet data convergence protocol (PDCP) 714 sublayer, which are terminated at the eNB on the network side. Although not shown, the UE may have several upper layers above the L2 layer 708 including a network layer (e.g., IP layer) that is terminated at the PDN gateway 518 (see FIG. 5) on the network side, and an application layer that is terminated at the other end of the connection (e.g., far end UE, server, etc.).

The PDCP sublayer 714 provides multiplexing between different radio bearers and logical channels. The PDCP sublayer 714 also provides header compression for upper layer data packets to reduce radio transmission overhead, security by ciphering the data packets, and handover support for UEs between eNBs. The RLC sublayer 712 provides segmentation and reassembly of upper layer data packets, retransmission of lost data packets, and reordering of data packets to compensate for out-of-order reception due to hybrid automatic repeat request (HARQ). The MAC sublayer 710 provides multiplexing between logical and transport channels. The MAC sublayer 710 is also responsible for allocating the various radio resources (e.g., resource blocks) in one cell among the UEs. The MAC sublayer 710 is also responsible for HARQ operations.

In the control plane, the radio protocol architecture for the UE and eNB is substantially the same for the physical layer 706 and the L2 layer 708 with the exception that there is no header compression function for the control plane. The control plane also includes a radio resource control (RRC) sublayer 716 in Layer 3. The RRC sublayer 716 is responsible for obtaining radio resources (i.e., radio bearers) and for configuring the lower layers using RRC signaling between the eNB and the UE.

Figure 8:
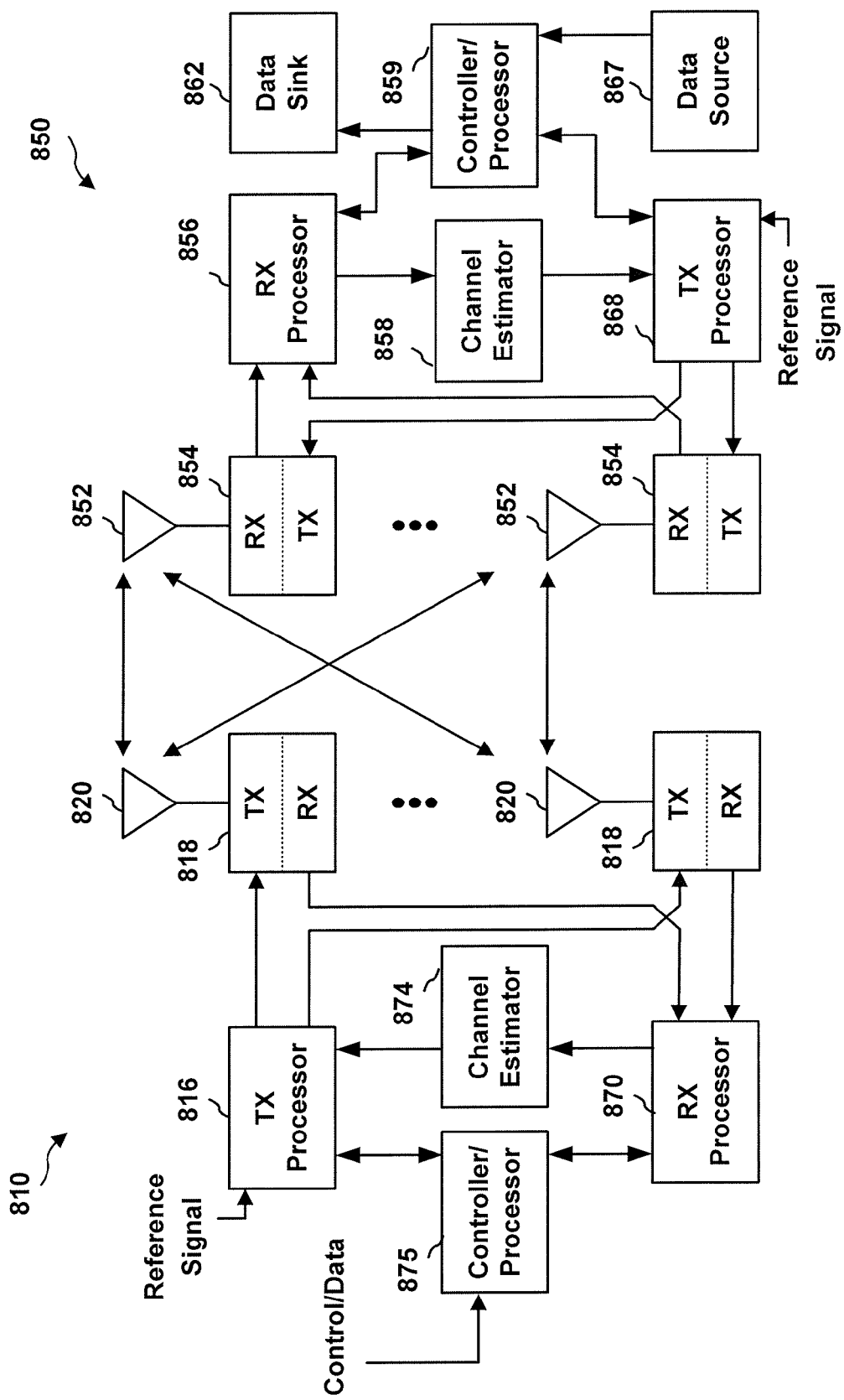
FIG. 8 is a diagram illustrating an example of an evolved Node B and user equipment in an access network.

FIG. 8 is a block diagram of an eNB 810 in communication with a UE 850 in an access network. In an aspect, eNB 810 may represent shared eNodeB 106, first operator primary cell 110, and/or second operator primary cell 112 of FIG. 1 and UE 850 may represent one or both of UE 102 and 104 of FIG. 1. In the downlink (DL), upper layer packets from the core network are provided to a controller/processor 875. The controller/processor 875 implements the functionality of the L2 layer described earlier in connection with FIG. 7. In the DL, the controller/processor 875 provides header compression, ciphering, packet segmentation and reordering, multiplexing between logical and transport channels, and radio resource allocations to the UE 850 based on various priority metrics. The controller/processor 875 is also responsible for HARQ operations, retransmission of lost packets, and signaling to the UE 850.

The transmit (TX) processor 816 implements various signal processing functions for the L1 layer (i.e., physical layer). The signal processing functions includes coding and interleaving to facilitate forward error correction (FEC) at the UE 850 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 874 may be used to determine the coding and modulation scheme, as well as for spatial processing. The channel estimate may be derived from a reference signal and/or channel condition feedback transmitted by the UE 850. Each spatial stream is then provided to a different antenna 820 via a separate transmitter 818TX. Each transmitter 818TX modulates an RF carrier with a respective spatial stream for transmission.

At the UE 850, each receiver 854RX receives a signal through its respective antenna 852. Each receiver 854RX recovers information modulated onto an RF carrier and provides the information to the receiver (RX) processor 856.

The RX processor 856 implements various signal processing functions of the L1 layer. The RX processor 856 performs spatial processing on the information to recover any spatial streams destined for the UE 850. If multiple spatial streams are destined for the UE 850, they may be combined by the RX processor 856 into a single OFDM symbol stream. The RX processor 856 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 810. These soft decisions may be based on channel estimates computed by the channel estimator 858. The soft decisions are then decoded and deinterleaved to recover the data and control signals that were originally transmitted by the eNB 810 on the physical channel. The data and control signals are then provided to the controller/processor 859.

The controller/processor 859 implements the L2 layer described earlier in connection with FIG. 7. In the UL, the control/processor 859 provides demultiplexing between transport and logical channels, packet reassembly, deciphering, header decompression, control signal processing to recover upper layer packets from the core network. The upper layer packets are then provided to a data sink 862, which represents all the protocol layers above the L2 layer.

Various control signals may also be provided to the data sink 862 for L3 processing. The controller/processor 859 is also responsible for error detection using an acknowledgement (ACK) and/or negative acknowledgement (NACK) protocol to support HARQ operations.

In the UL, a data source 867 is used to provide upper layer packets to the controller/processor 859. The data source 867 represents all protocol layers above the L2 layer (L2). Similar to the functionality described in connection with the DL transmission by the eNB 810, the controller/processor 859 implements the L2 layer for the user plane and the control plane by providing header compression, ciphering, packet segmentation and reordering, and multiplexing between logical and transport channels based on radio resource allocations by the eNB 810. The controller/processor 859 is also responsible for HARQ operations, retransmission of lost packets, and signaling to the eNB 810.

Channel estimates derived by a channel estimator 858 from a reference signal or feedback transmitted by the eNB 810 may be used by the TX processor 868 to select the appropriate coding and modulation schemes, and to facilitate spatial processing. The spatial streams generated by the TX processor 868 are provided to different antenna 852 via separate transmitters 854TX. Each transmitter 854TX modulates an RF carrier with a respective spatial stream for transmission.

The UL transmission is processed at the eNB 810 in a manner similar to that described in connection with the receiver function at the UE 850. Each receiver 818RX receives a signal through its respective antenna 820. Each receiver 818RX recovers information modulated onto an RF carrier and provides the information to a RX processor 870. The RX processor 870 implements the L1 layer.

The controller/processor 859 implements the L2 layer described earlier in connection with FIG. 7. In the UL, the control/processor 859 provides demultiplexing between transport and logical channels, packet reassembly, deciphering, header decompression, control signal processing to recover upper layer packets from the UE 850. Upper layer packets from the controller/processor 875 may be provided to the core network. The controller/processor 859 is also responsible for error detection using an ACK and/or NACK protocol to support HARQ operations.

Figure 9:
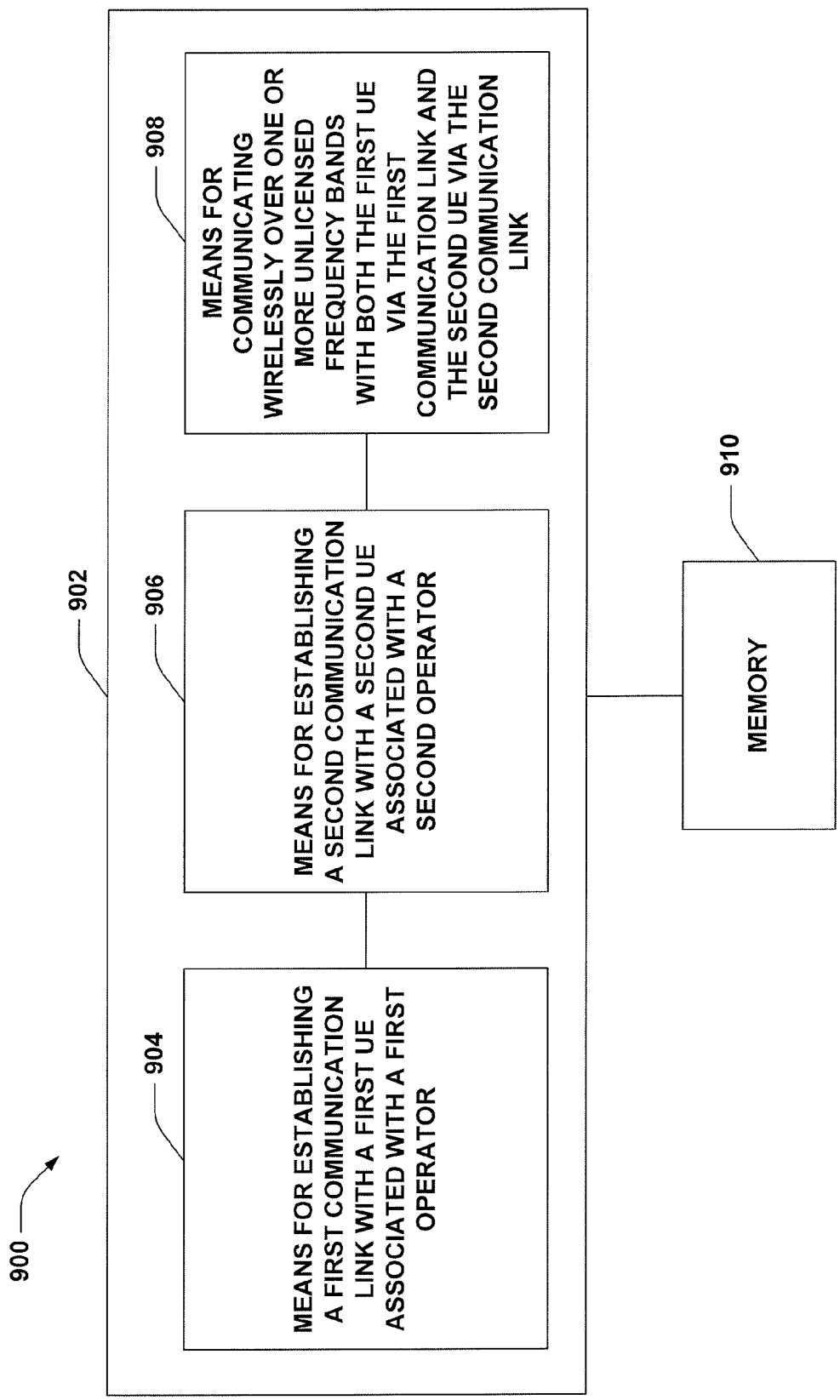
FIG. 9 is a diagram illustrating an example system that communicates wirelessly with a plurality of UEs over one or more unlicensed frequency bands.

With reference to FIG. 9, illustrated is a system 900 that communicates wirelessly with a plurality of UEs associated with a plurality of operators over one or more unlicensed frequency bands. For example, system 900 can reside at least partially within shared eNodeB 106 of FIG. 1, etc. It is to be appreciated that system 900 is represented as including functional blocks, which can be functional blocks that represent functions implemented by a processor, software, or combination thereof (e.g., firmware). System 900 includes a logical grouping 902 of means that can act in conjunction. For instance, logical grouping 902 can include means for establishing a first communication link with a first UE associated with a first operator 904. Further, logical grouping 902 can comprise means for establishing a second communication link with a second UE associated with a second operator, wherein the shared eNodeB is configured to communicate with both a first network associated with the first operator and a second network associated with the second operator 906. Additionally, logical grouping 902 can comprise means for communicating wirelessly over one or more unlicensed frequency bands with both the first UE via the first communication link and the second UE via the second communication 908. Thus, as described, system 900 may be configured to establish communication links and communicate with a plurality of UEs, each associated with unique operators, over one or more unlicensed frequency bands. Additionally, system 900 can include a memory 910 that retains instructions for executing functions associated with the means 904, 906, and 908. While shown as being external to memory 910, it is to be understood that one or more of the means 904, 906, and 908 can exist within memory 910.

By way of example, various aspects of the present disclosure may be extended to other UMTS systems such as W-CDMA, TD-SCDMA, High Speed Downlink Packet Access (HSDPA), High Speed Uplink Packet Access (HSDPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods or methodologies described herein may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communications, comprising:
   establishing, at a shared base station, a first communication link with a first user equipment (UE) associated with a first operator;
   establishing, at the shared base station, a second communication link with a second UE associated with a second operator, wherein the shared base station is configured to communicate with both a first network associated with the first operator and a second network associated with the second operator;
   communicating wirelessly, at the shared base station, over one or more unlicensed frequency bands with both the first UE via the first communication link and the second UE via the second communication link; and
   determining, at the shared base station, a transmission routing order based on the communications with both the first UE and the second UE over the one or more unlicensed frequency bands.

2. The method of claim 1, wherein the first UE communicates with the first network via a first primary communication link and the second UE communicates with the second network via a second primary communication link, and wherein at least one of the first communication link and the second communication link comprises a secondary connection in a dual-connectivity wireless communication system.

3. The method of claim 1, further comprising receiving operator network identification information from at least one of the first UE or the second UE, wherein the operator network identification information indicates that the first operator is associated with the first UE or the second operator is associated with the second UE.

4. The method of claim 3, further comprising:
   receiving uplink data from at least one of the first UE or the second UE over the one or more unlicensed frequency bands;
   determining an operator network to which the uplink data is to be routed based on the operator network identification information; and
   routing the uplink data to a network entity associated with the operator network.

5. The method of claim 4, further comprising allocating one or more backhaul resources for the uplink data in the operator network.

6. The method of claim 1, further comprising:
   receiving first downlink data from a first operator network associated with the first operator, wherein the first downlink data includes first destination information indicating that the first UE is to receive the first downlink data;
   receiving second downlink data from a second operator network associated with the second operator, wherein the second downlink data includes second destination information indicating the second UE is to receive the second downlink data;
   generating a transmission schedule for transmitting the first downlink data and the second downlink data; and
   transmitting, over the one or more unlicensed frequency bands, both the first downlink data to the first UE and the second downlink data to the second UE based on the transmission schedule.

7. The method of claim 6, wherein the first downlink data is encoded according to a first encoding standard associated with the first operator and the second downlink data is encoded according to a second encoding standard associated with the second operator.

8. The method of claim 1, further comprising transmitting a common transmission over the one or more unlicensed frequency bands to both of the first UE and the second UE via a broadcast channel.

9. The method of claim 1, wherein the one or more unlicensed frequency bands comprise a frequency of at least one of about 5 GHz, about 3.5 GHz, or about 2.4 GHz.

10. The method of claim 1, wherein the first UE communicates with the first network via a first primary communication link and the second UE communicates with the second network via a second primary communication link, and wherein at least one of the first communication link or the second communication link comprises a supplemental communication link.

11. The method of claim 1, wherein the shared base station serves as a standalone base station on a condition that:
   at least one of the first UE or the second UE is not yet associated with a licensed band operator; or
   at least one of the first UE or the second UE is not within a coverage of the licensed band operator.

12. An apparatus for mobile communications, comprising:
   a memory storing executable instructions; and
   a processor in communication with the memory, wherein the processor is configured to execute the instructions to:

establish a first communication link with a first user equipment (UE) associated with a first operator and a second communication link with a second UE associated with a second operator;

communicate with both a first network associated with the first operator and a second network associated with the second operator;

communicate wirelessly over one or more unlicensed frequency bands with both the first UE via the first communication link and the second UE via the second communication link; and determine a transmission routing order based on the communications with both the first UE and the second UE over the one or more unlicensed frequency bands.

13. The apparatus of claim 12, wherein the first UE communicates with the first network via a first primary communication link and the second UE communicates with the second network via a second primary communication link, and wherein at least one of the first communication link and the second communication link comprise a secondary connection in a dual-connectivity wireless communication system.

14. The apparatus of claim 12, wherein the processor is further configured to execute the instructions to receive operator network identification information from at least one of the first UE or the second UE, wherein the operator network identification information indicates that the first operator is associated with the first UE or the second operator is associated with the second UE.

15. The apparatus of claim 14, wherein the processor is further configured to execute the instructions to:
receive uplink data from at least one of the first UE or the second UE over the one or more unlicensed frequency bands;
determine an operator network to which the uplink data is to be routed based on the operator network identification information; and
route the uplink data to a network entity associated with the operator network.

16. The apparatus of claim 15, wherein the processor is further configured to execute the instructions to allocate one or more backhaul resources for the uplink data in the operator network.

17. The apparatus of claim 12, wherein the processor is further configured to execute the instructions to:
receive first downlink data from a first operator network associated with the first operator, wherein the first downlink data includes first destination information indicating that the first UE is to receive the first downlink data;
receive second downlink data from a second operator network associated with the second operator, wherein the second downlink data includes second destination information indicating the second UE is to receive the second downlink data;
generate a transmission schedule for transmitting the first downlink data and the second downlink data; and
transmit, over the one or more unlicensed frequency bands, both the first downlink data to the first UE and the second downlink data to the second UE based on the transmission schedule.

18. The apparatus of claim 17, wherein the first downlink data is encoded according to a first encoding standard associated with the first operator and the second downlink data is encoded according to a second encoding standard associated with the second operator.

19. The apparatus of claim 12, wherein the processor is further configured to execute the instructions to transmit a common transmission over the one or more unlicensed frequency bands to both of the first UE and the second UE via a broadcast channel.

20. The apparatus of claim 12, wherein the one or more unlicensed frequency bands comprise a frequency of at least one of about 5 GHz, about 3.5 GHz, or about 2.4 GHz.

21. The apparatus of claim 12, wherein the first UE communicates with the first network via a first primary communication link and the second UE communicates with the second network via a second primary communication link, and wherein at least one of the first communication link or the second communication link comprises a supplemental communication link.

22. An apparatus for mobile communications, comprising:
means for establishing, at a shared base station, a first communication link with a first user equipment (UE) associated with a first operator;
means for establishing, at the shared base station, a second communication link with a second UE associated with a second operator, wherein the shared base station is configured to communicate with both a first network associated with the first operator and a second network associated with the second operator;
means for communicating wirelessly over one or more unlicensed frequency bands with both the first UE via the first communication link and the second UE via the second communication link; and
means for determining, at the shared base station, a transmission routing order based on the communications with both the first UE and the second UE over the one or more unlicensed frequency bands.

23. The apparatus of claim 22, wherein the first UE communicates with the first network via a first primary communication link and the second UE communicates with the second network via a second primary communication link, and wherein at least one of the first communication link and the second communication link comprise a secondary connection in a dual-connectivity wireless communication system.

24. The apparatus of claim 22, further comprising:
means for receiving first downlink data from a first operator network associated with the first operator, wherein the first downlink data includes first destination information indicating that the first UE is to receive the first downlink data;
means for receiving second downlink data from a second operator network associated with the second operator, wherein the second downlink data includes second destination information indicating the second UE is to receive the second downlink data;
means for generating a transmission schedule for transmitting the first downlink data and the second downlink data; and
means for transmitting, over the one or more unlicensed frequency bands, both the first downlink data to the first UE and the second downlink data to the second UE based on the transmission schedule.

25. The apparatus of claim 22, wherein the means for communicating wirelessly further comprises means for transmitting a common transmission over the one or more unlicensed frequency bands to both of the first UE and the second UE via a broadcast channel.

26. A non-transitory computer-readable storage medium, comprising instructions, that when executed by a processor, cause the processor to:
- establish, at a shared base station, a first communication link with a first user equipment (UE) associated with a first operator;
- establish, at the shared base station, a second communication link with a second UE associated with a second operator, wherein the shared base station is configured to communicate with both a first network associated with the first operator and a second network associated with the second operator;
- communicate wirelessly over one or more unlicensed frequency bands with both the first UE via the first communication link and the second UE via the second communication link; and
- determine, at the shared base station, a transmission routing order based on the communications with both the first UE and the second UE over the one or more unlicensed frequency bands.

27. The computer-readable storage medium of claim 26, wherein the first UE communicates with the first network via a first primary communication link and the second UE communicates with the second network via a second primary communication link, and wherein at least one of the first communication link and the second communication link comprise a secondary connection in a dual-connectivity wireless communication system.

28. The computer-readable storage medium of claim 26, further comprising instructions, that when executed by the processor, cause the processor to:
- receive first downlink data from a first operator network associated with the first operator, wherein the first downlink data includes first destination information indicating that the first UE is to receive the first downlink data;
- receive second downlink data from a second operator network associated with the second operator, wherein the second downlink data includes second destination information indicating the second UE is to receive the second downlink data;
- generate a transmission schedule for transmitting the first downlink data and the second downlink data; and
- transmit, over the one or more unlicensed frequency bands, both the first downlink data to the first UE and the second downlink data to the second UE based on the transmission schedule.

29. The computer-readable storage medium of claim 26, further comprising instructions, that when executed by the processor, cause the processor to transmit a common transmission over the one or more unlicensed frequency bands to both of the first UE and the second UE via a broadcast channel.

30. The computer-readable storage medium of claim 26, wherein the one or more unlicensed frequency bands comprise a frequency of at least one of about 5 GHz, about 3.5 GHz, or about 2.4 GHz.

31. The computer-readable storage medium of claim 26, wherein the first UE communicates with the first network via a first primary communication link and the second UE communicates with the second network via a second primary communication link, and wherein at least one of the first communication link or the second communication link comprises a supplemental communication link to the shared base station.

* * * * *